United States Patent [19]

Scheuneman

[11] 3,921,150

[45] Nov. 18, 1975

[54] THREE-RANK PRIORITY SELECT REGISTER SYSTEM FOR FAIL-SAFE PRIORITY DETERMINATION

[75] Inventor: James H. Scheuneman, St. Paul, Minn.

[73] Assignee: Sperry Rand Corporation, New York, N.Y.

[22] Filed: Sept. 12, 1974

[21] Appl. No.: 505,434

[52] U.S. Cl. .......... 340/172.5
[51] Int. Cl.² .......... G06F 3/00
[58] Field of Search .......... 340/172.5

[56] References Cited

UNITED STATES PATENTS

| | | | |
|---|---|---|---|
| 3,603,935 | 9/1971 | Moore | 340/172.5 |
| 3,611,305 | 10/1971 | Greenspan | 340/172.5 |
| 3,643,218 | 2/1972 | Cramwinckel | 340/172.5 |
| 3,643,229 | 2/1972 | Stuebe | 340/172.5 |
| 3,755,787 | 8/1973 | Henegar | 340/172.5 |

*Primary Examiner*—Raulfe B. Zache
*Attorney, Agent, or Firm*—Kenneth T. Grace; Thomas J. Nikolai; Marshall M. Truex

[57] ABSTRACT

Disclosed is a memory-unit-associated priority system that detects if information (data) sent to a memory unit was or could have been in error due to an asynchronous "priority request" signal being presented to the priority logic at the time the priority logic was being clocked (loaded).

5 Claims, 10 Drawing Figures

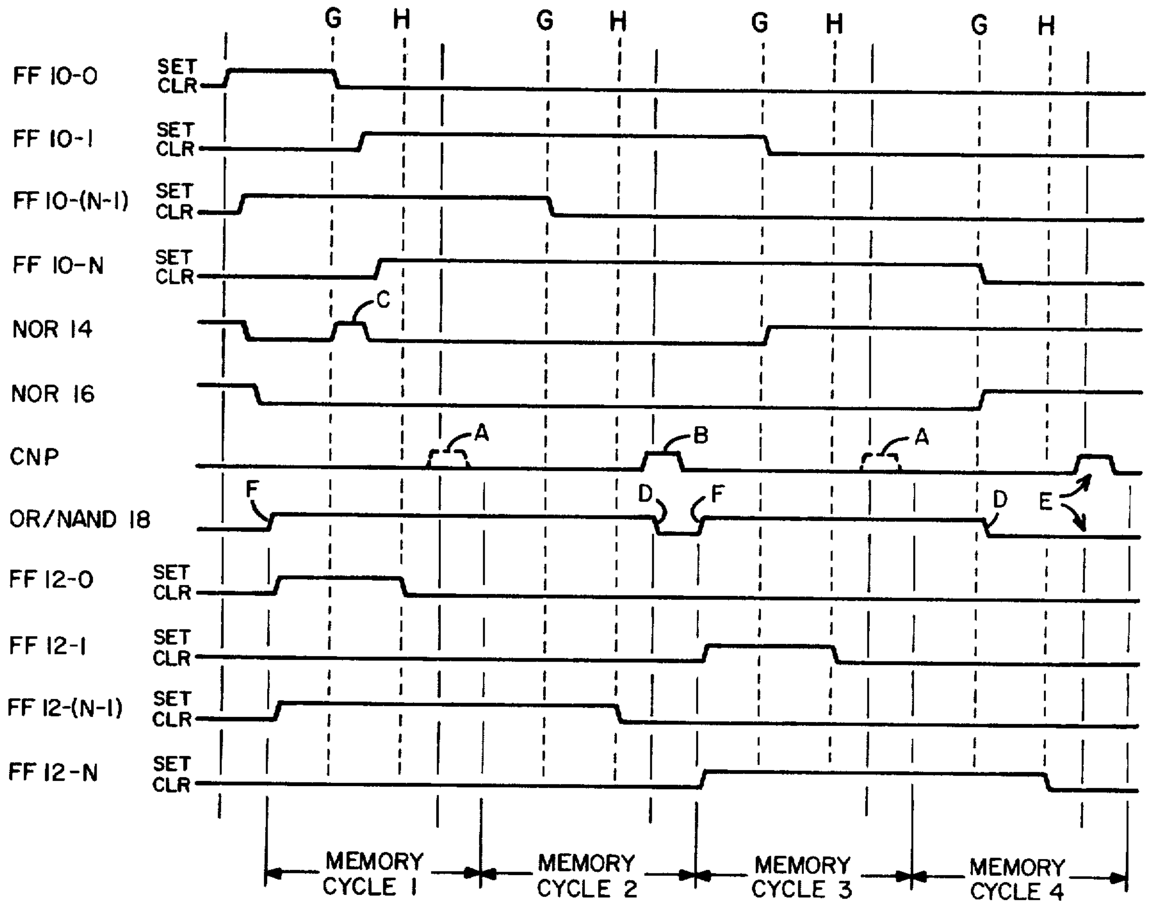

Fig. 2
PRIOR ART

NOTES:

A. NOT GENERATED BECAUSE A FF 12 IS SET.

B. GENERATED BECAUSE NO FF 12 IS SET.

C. NOR 14 OUTPUT GOES HI WHEN FF 10-0 IS CLEARED AND THEN GOES LO WHEN FF 10-1 IS SET.

D. OR/NAND 18 OUTPUT GOES LO WHEN ALL FFs10 ARE CLEAR.

E. CNP GOES HI, BUT, AS ALL FFs10 ARE CLEAR, OR/NAND 18 OUTPUT STAYS LO.

F. POSITIVE TRANSITION OF OR/NAND 18 OUTPUT TRANSFERS FF 10 INTO FF 12. IF D INPUT TO FF 12 CHANGES AT SUBSTANTIALLY THE SAME TIME AS E INPUT TO FF 12, RINGING OCCURS.

G. FF 10 SELECTIVELY CLEARED WHEN ASSOCIATED PRIORITY REQUEST IS SATISFIED.

H. FF 12 SELECTIVELY CLEARED WHEN ASSOCIATED PRIORITY REQUEST IS SATISFIED.

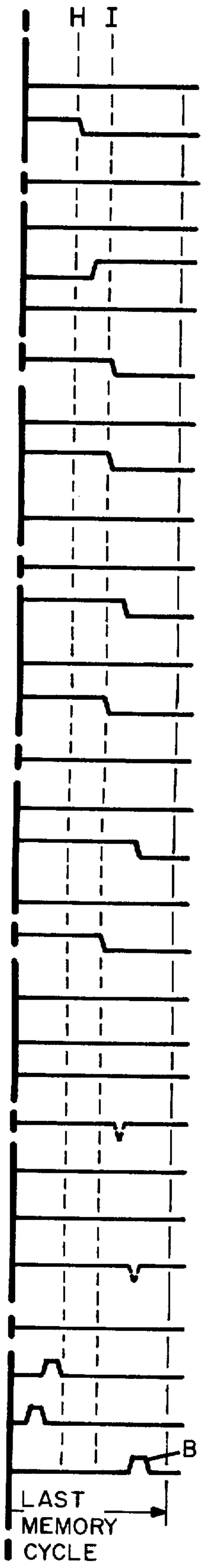

NOTES:

A. NOT GENERATED BECAUSE A FF32 IS SET.

B. GENERATED BECAUSE NO FF32 IS SET.

C. NOR 14,16 OUTPUT GOES LO WHEN A FF10 IS SET.

D. OR/NAND 18 OUTPUT GOES HI WHEN CNP IS LO AND A FF10 IS SET, OTHERWISE OR/NAND 18 OUTPUT IS LO.

E. POSITIVE TRANSITION OF OR/NAND 18 OUTPUT TRANSFERS FF10 INTO FF30; DELAYS 21 AND 23 TRANSFER FF10 INTO FF32 AND FF34 AT SUCCESSIVELY GREATER DELAY PERIODS.

F. IF D AND E INPUTS TO FF's 30,32,34 CHANGE AT SUBSTANTIALLY THE SAME TIME, RINGING OCCURS.

G. EXCLUSIVE OR 36 OUTPUT IS LO WHEN STATES OF FF's 30,34 ARE DIFFERENT.

H. FF10 SELECTIVELY CLEARED WHEN ASSOCIATED PRIORITY REQUEST IS SATISFIED.

I. FF's 30,32,34 SELECTIVELY CLEARED WHEN ASSOCIATED PRIORITY REQUEST IS SATISFIED.

J. WHEN AND 40 OUTPUT IS HI, MEMORY CYCLE IS ABORTED AND THEN REPEATED.

Fig. 4c

THREE-RANK PRIORITY SELECT REGISTER SYSTEM FOR FAIL-SAFE PRIORITY DETERMINATION

CROSS REFERENCE TO RELATED APPLICATION

The present application is related to my copending patent application entitled "FAIL-SAFE PRIORITY SYSTEM," filed June 10, 1974, having Ser. No. 477,942.

BACKGROUND OF THE INVENTION

In the prior art, the priority system could generate a runt signal if a priority request signal and a clock signal were initiated at substantially the same time. The runt signal, when used to switch, i.e., Set or Clear, an associated priority select flip-flop, could cause the associated priority select flip-flop to ring or to oscillate between its two bistable states and eventually settle into an unpredeterminable one of such two states causing the associated 1 -out-of-N priority network to generate erroneous priority signals. Further, even if the priority select flip-flop could be designed to accept runt signals and to be switched into its proper state after ringing, the delay period required to allow for dampening of the ringing sequence would extend beyond the normal memory cycle, e.g., a read then write operation in a core memory system, preventing the efficient operation thereof. Thus, there is required a priority system not subject to the deleterious effects of the above ringing sequence.

SUMMARY OF THE INVENTION

In the priority system of the present invention, there is provided a request receive register formed of a plurality of request receive flip-flops. Each request receive flip-flop is adapted to receive and store an associated priority request signal coupled thereto by the associated data processing system. Additionally provided is a three-rank holding register comprised of three priority select registers A, B, C. The request receive register receives at its individual request receive flip-flops associated priority request signals which priority request signals are, in turn, coupled in parallel to the like-ordered or associated priority select flip-flops of each of the priority select registers A, B, C. A CNP signal and one or more of the priority request signals from the request receive flip-flops generate, via an OR/NAND gate, an enable signal which in turn gates the priority request signals from the request receive flip-flops of the request receive register into the associated priority select flip-flops of priority select register A. The so-generated enable signal is then successively delayed at the priority select flip-flops of the priority select registers B and C such that the priority request signals are successively, in time, gated into the associated priority select flip-flops of priority select registers B and C. The outputs of the priority select flip-flops of the priority select registers A and C are coupled to associated Exclusive OR gates while the outputs of the priority select flip-flops of priority select register B are coupled to a 1-out-of N priority network. When the associated priority select flip-flops of the priority select registers A and C are of a like state, e.g., when a priority request signal has been successively transferred from the request receive flip-flops of the request receive register through the priority select flip-flops of priority select registers A, B and finally into priority select register C, the memory cycle is initiated and the priority as determined by the 1-out-of-N priority network is selected. Alternatively, when the associated Exclusive OR gates indicate that one or more of the associated priority select flip-flops of the priority select registers A and C are not alike, e.g., a priority request signal which has been transferred into a priority select flip-flop of priority select register A has not yet been transferred into the like-ordered priority select flip-flop of priority select register C, the memory cycle is aborted and the priority system is again initiated by a new CNP signal.

BRIEF DESCRIPTION OF THE DRAWINGS

FIG. 2 is an illustration of a timing diagram associated with the priority system of FIG. 1.

DESCRIPTION OF THE PRIOR ART

Figure 1:
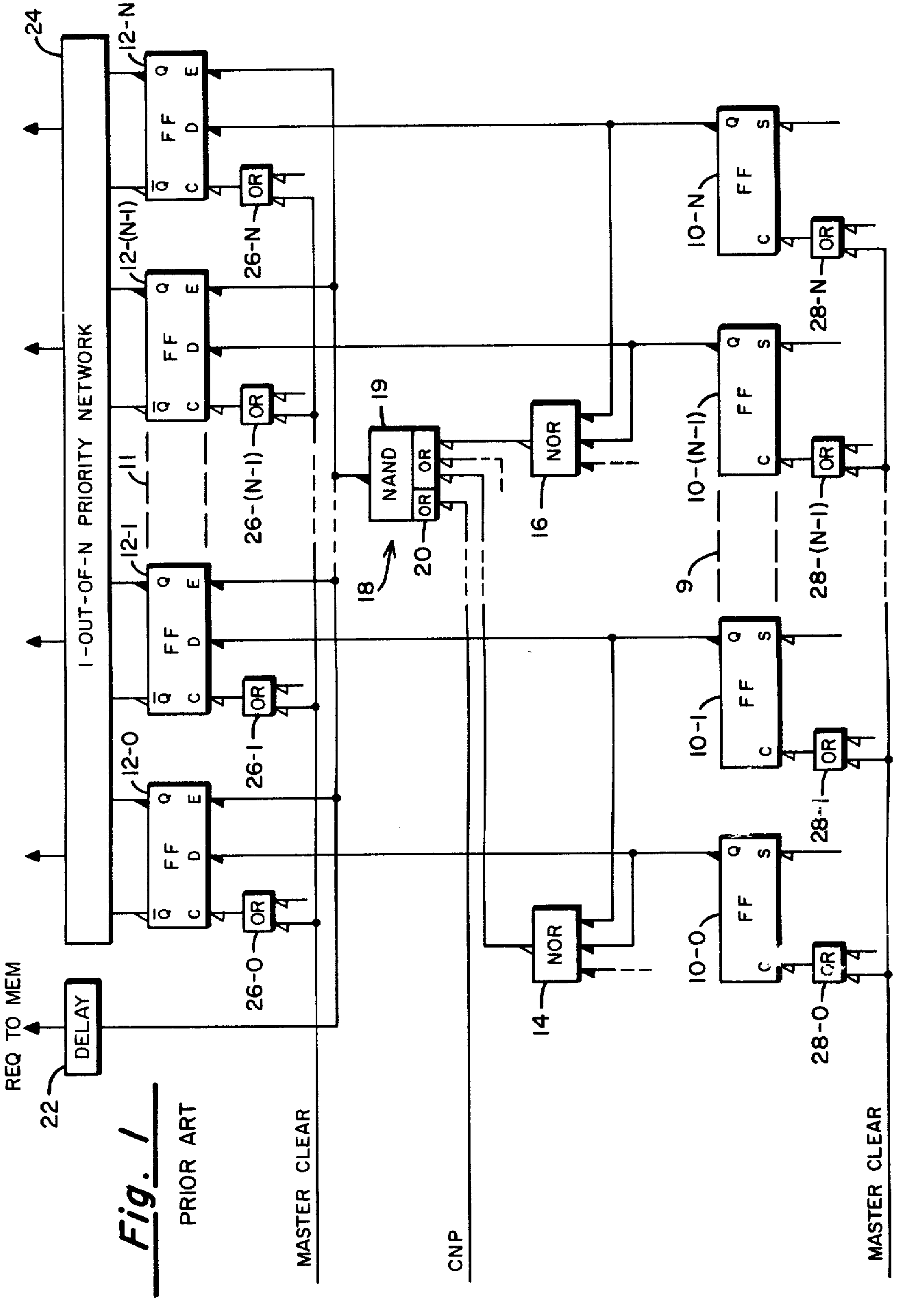
Fig. 1 PRIOR ART
FIG. 1 is an illustration of a prior art priority system.

With particular reference to FIGS. 1 and 2 there are illustrated a prior art priority system and a timing diagram therefor. In this prior art configuration, there is provided a request receive register 9 formed of a plurality of request receive flip-flops (FFs) 10-0, 10-1, . . . 10-(N-1), 10-N, each request receive flip-flop 10 being adapted to receive, and hold an associated priority request signal. Additionally provided is a priority select register 11 formed of a plurality of priority select FFs 12-0, 12-1, . . . 12-(N-1), 12-N, for holding selected ones of said priority request signals held in the associated request receive flip-flops of request receive register 9. Intermediate request receive register 9 and priority select register 11 are one or more NORs 14, 16 and an OR/NAND 18. The output of each request receive FF 10 is coupled as a separate input to one of the NORs 14, 16 and as a Date (D) input to an associated one of the priority select FFs 12. The outputs of NORs 14, 16 are, in turn, coupled as OR'ed inputs to OR/NAND 18, the output of which is coupled in parallel to the Enable (E) input of all of the priority select FFs 12. A clock new priority (CNP) signal is coupled as a separate input OR input to OR/NAND 18, as at OR 20, such that when the CNP signal is Lo⇒4 a Lo⇒4 signal from one or more of NORs 14, 16 (representative of the associated request receive FF 10 holding a priority request signal) causes the output of OR/NAND 18 to go Hi⇒4 enabling the Data input from a request receive FF 10 to be gated into the associated priority select FF 12. Thus, Date from the request receive FFs 10 are selfclocked into the associated priority select FF 12 except when blocked by a Hi⇒4 CNP signal. As each of the priority request signals, as stored in the priority select FFs 12 are serviced through the 1-out-of-N priority network 24 the associated request receive FFs 10 and priority select FFs 12 are Cleared via a selective Clear signal coupled to the Clear OR gates 26-0, 26-1, . . . 26-(N-1). 26-N and 28-0, 28-1, . . . 28-(N-1), 28-N, respectively, at the C input.

When the output of OR/NAND 18 goes positive (E→4), the priority system, through delay 22, initiates a memory cycle via a request to memory signal. If only one priority request signal had been received by the request receive FFs 10 but during the memory cycle one or more additional priority request signals are received by the request receive FFs 10 these additional priority request signals would not be loaded into their associated priority select FFs 12 as the output of OR/NAND gate 18 would remain Hi⇒4(a positive transition E →4 is required to load the Data input into the priority select FFs 12). Near the end of the memory cycle the outputs of the priority select FFs 12 are checked to determine if there are any more priority request signals loaded therein (Q⇒4 ). If no priority select FFs 12 are SET then the signal Hi Clock New Priority (CNP) is generated causing the output of OR/NAND 18 to go Lo⇒4; if no priority receive FFs 10 are SET the output of OR/NAND gate 18 would already be Lo⇒4 . If any priority receive FF 10 is SET a positive transition of the output of OR/NAND gate 18 (E→4 ) will occur as the signal Hi Clock New Priority (CNP) goes low (CNP→ 4 ) resulting in the new priority request signals held in the associated priority receives FFs 10 being loaded or transferred into the associated priority select FFs 12.

In this prior art configuration, the priority system could generate a clock signal, the positive-going transition of the output signal of NAND 18 at the E inputs of the priority select FFs 12, at about the same time that one or more priority request signals were being received by the priority receive FFs 10. While the first priority request signal received by one of the priority receive FFs 10, which first priority request signal is the priority request signal that will initiate the clock signal, will definitely be loaded into its associated priority select FF 12, the possibility exists that one or more priority request signals will be received by their associated priority receive FFs 10 at substantially the same time that the clock signal is generated. If the Data inputs to the priority select FFs 12 change at substantially the same time as the clock signal (E→4 ), the associated priority select FFs 12 will ring or have a delayed setting time and may eventually settle into an indeterminable one of their two stable states. This ringing of the priority select FFs 12 causes the 1-out-of-N priority network 24 to generate and to couple erroneous priority request signals to its output lines.

DESCRIPTION OF THE PREFERRED EMBODIMENT

Figures 3, 3A, 4:
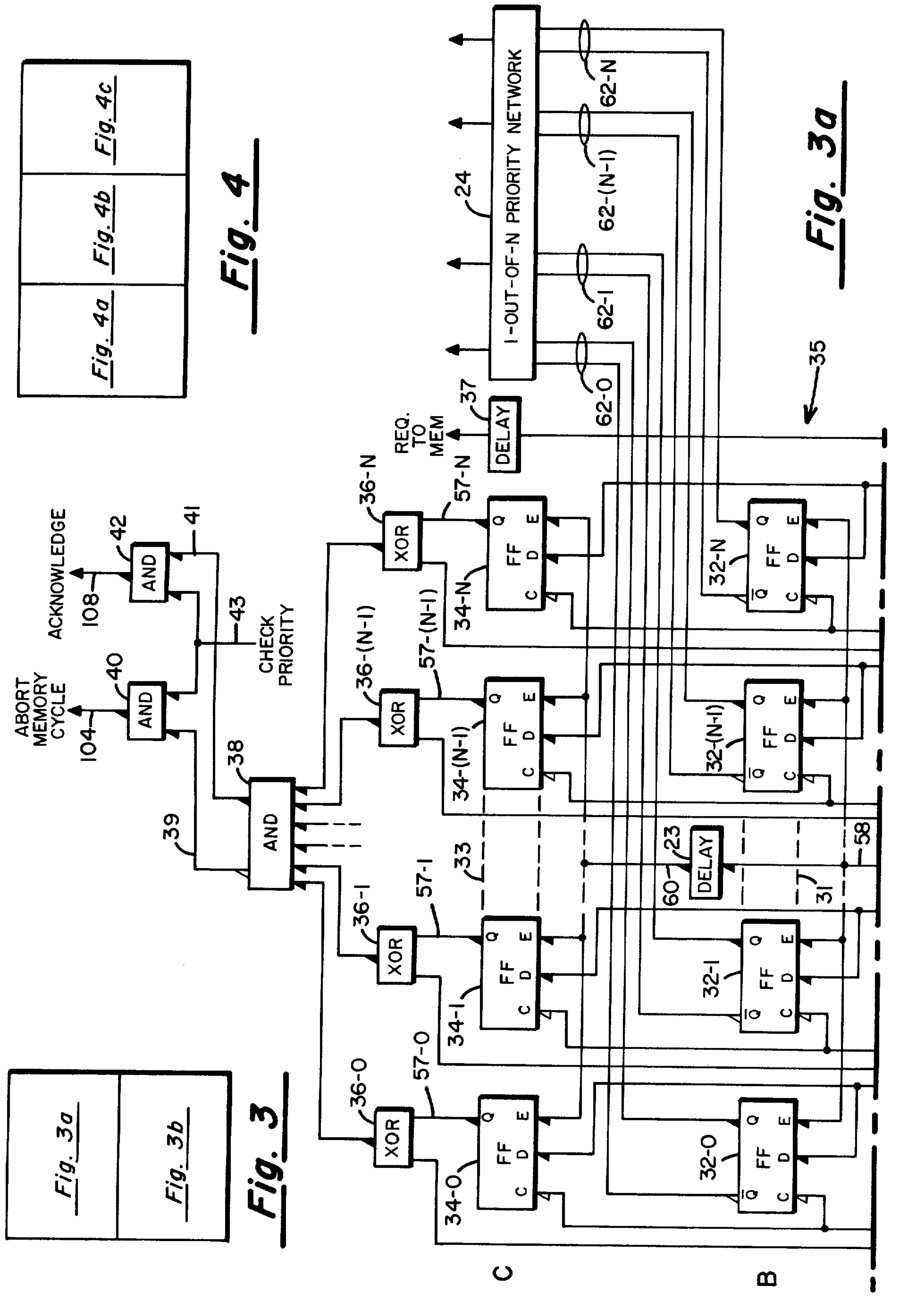
FIG. 3 is an illustration of a priority system incorporating the present invention.
FIG. 4 is an illustration of a timing diagram associated with the priority system of FIG. 3.
Figure 3B:
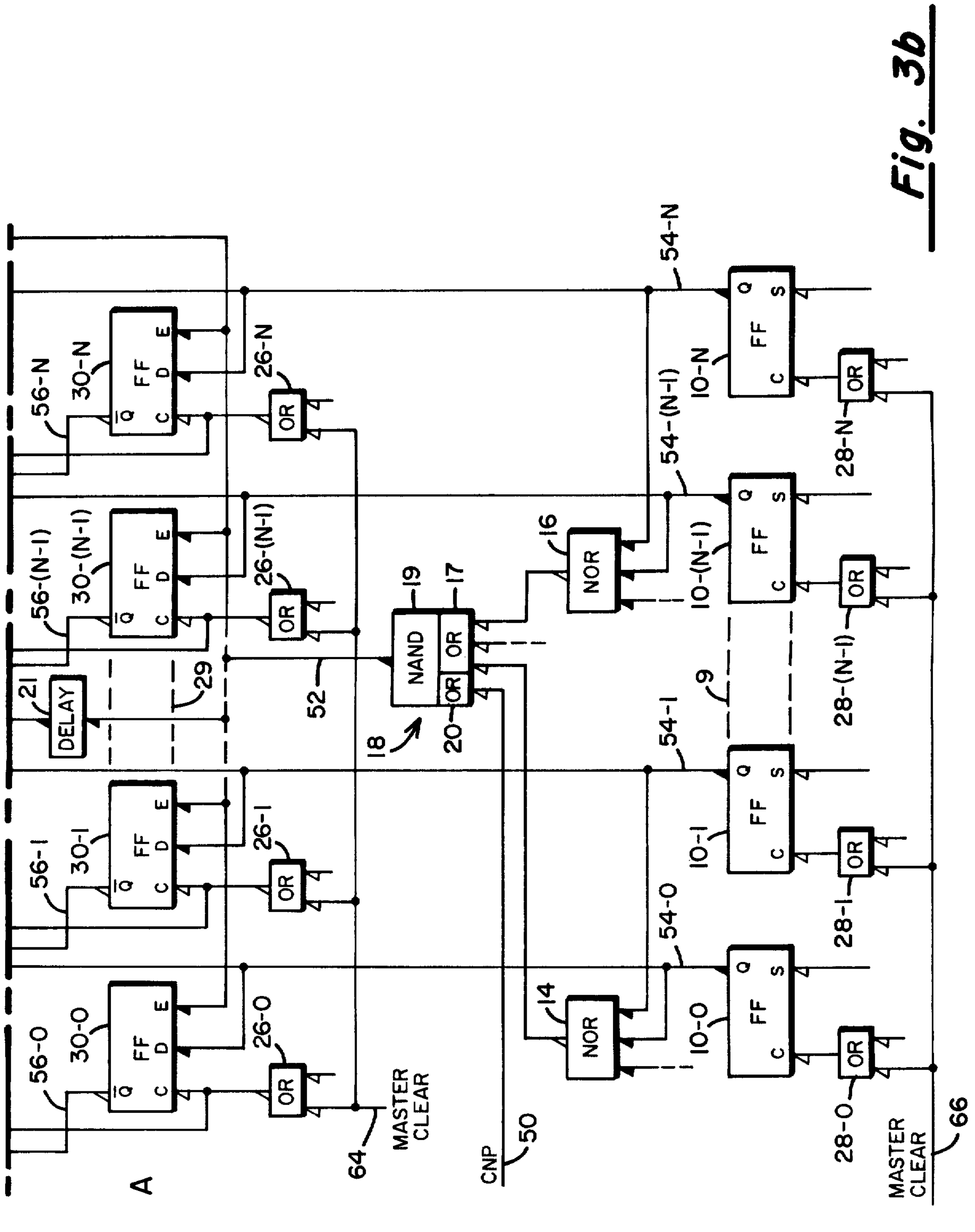
Figure 4A:
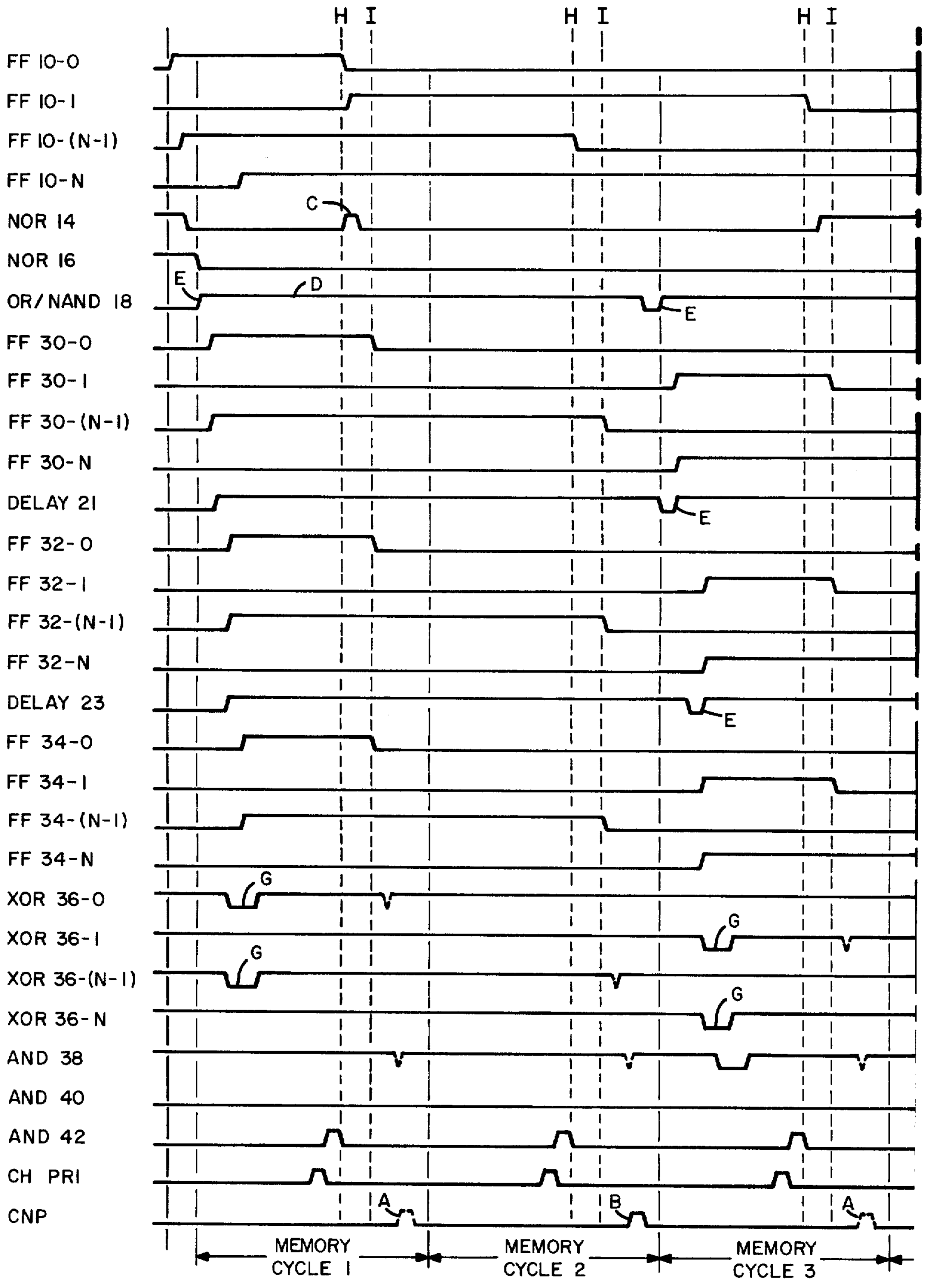
Figure 4B:
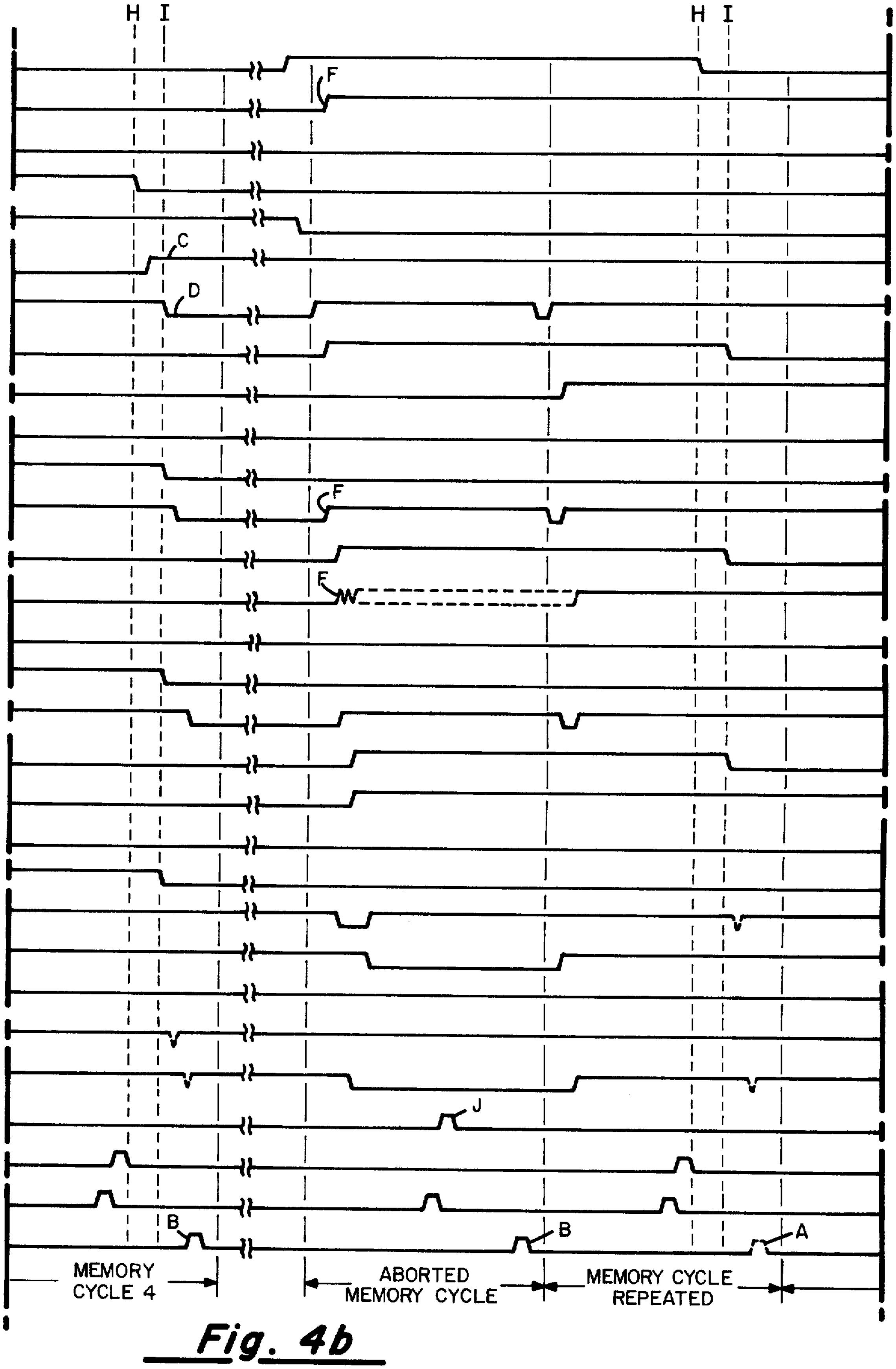

With particular reference to FIGS. 3, 4 there are illustrated a priority system incorporating the present invention and the timing diagram therefor. In the configuration of FIG. 3 wherein like components of FIG. 1 are identified by like reference numbers, there is provided a request receive register 9 formed of a plurality of request receive flip-flops (FFs) 10-0, 10-1, . . . 10-(N-1), 10-N, each request receive FF 10 being adapted to receive and hold an associated priority request signal from an associated requester. Additionally, as provided by the novel configuration of FIG. 3 in contrast to that of the prior art configuration of FIG. 1, there is provided a three-rank holding register 35 formed of the three priority request register 29(A), 31(B), 33(C) wherein each is formed of a like plurality of like-ordered priority select flip-flops 30-0, 30-1 . . . 30-(N-1), 30-N; 32-0, 32-1, . . . 32-(N-1), 32-N; 34-0, 34-1, . . . 34-(N-1), 34-N, respectively, for holding selected ones of said priority request signals held in the associated, i.e., like-ordered, request receive flip-flops 10-0, 10-1, . . . 10-(N-1), 10-N, respectively, of request receive register 9.

As with the prior art priority system of FIG. 1, intermediate request receive register 9 and holding register 35, there are one or more NOR's 14, 16 and an OR/NAND 18. The output of each request receive flip-flop 10 is coupled as a separate input to one of the NOR's 14, 16. Additionally, the output of each request receive FF 10 of request receive register 9 is coupled, in parallel, as a Data (D) input to an associated one of the priority select FFs 30, 32, 34 of priority select registers 29, 31, 33, respectively. The outputs of NOR's 14, 16 are, in turn, coupled as OR'ed inputs to OR/NAND 18, the Enable signal output of which is directly coupled, in parallel, to the Enable (E) input of all of the priority select FFs 30 of priority select register 29. The delayed Enable signal output of OR/NAND 18 is at successive delay periods, by means of delays 21, 23 coupled, in parallel, to the Enable input of all of the priority select FFs 32, 34 of priority select registers 31, 33, respectively.

A clock new priority (CNP) signal is coupled as a separate input OR input to OR/NAND 18, as at OR 20, such that when the CNP signal is Lo⇒4, a Lo⇒4 signal from one or more of the NOR's 14, 16 (representative of the associated request receive FF 10 holding a priority request signal) causes the Enable signal output of OR/NAND 18 to go Hi⇒4, the positive transition enabling the Data signal input from a request receiver FF 10 to be gated into the associated priority select FF 30 of priority select register 29. Thus, Data from the request receive FFs 10 of request receive register 9 are self-clocked into the associated priority select FFs 30 of priority select register 29 except when blocked by a Hi⇒4CNP signal. After the Data, i.e., the priority request signals held in request receive FFs 10 of request receive register 9, have been gated into the associated priority select FFs 30 of priority select register 29, such priority request signals, as determined by the associated delays 21, 23, are successively gated into the associated priority select FFs 32, 34, or priority select registers 31, 33, respectively. As each of the priority request signals, as stored in the priority select FFs 32 of priority select register 31 are serviced through the 1-out-of-N priority network 24, the associated request receive FFs 10 and priority select FFs 30, 32, 34 are Cleared via a selected Clear signal coupled to the associated Clear OR gates at their C inputs.

When the output of OR/NAND 18 goes positive (E →4 ) the priority system, through delay 37 and a Request to Memory signal, initiates a memory cycle. If only one priority request signal had been priorly received by the request receive FFs 10 but during the memory cycle one or more additional priority request signals are received by the request receive FFs 10 these additional priority request signals would not be loaded into their associated priority select FFs 30, 32, 34 as the output of OR/NAND 18 would remain Hi⇒4 (a positive transition E - is required to load the Data inputs into the priority select FFs 30, 32, 34). Near the end of the memory cycle the outputs of the priority select FFs 32 are checked to determine if there are any more priority request signals loaded therein (Q⇒4). If no priority select FFs 32 are Set then the signal clock new priority (CNP) is Hi⇒4is generated causing the output of OR/NAND 18 to go Lo⇒4; if no priority receive FFs 10 are Set the output of OR/NAND 18 would already be Lo⇒4. If, any priority receive FF 10 is Set a positive transition of the output of OR/NAND 18 (E→ 4 ) will occur as the CNP signal goes Lo (CNP→4) resulting in the new priority request signals held in the associated priority receive FFs 10 being successively loaded or transferred into the associated priority select FFs 30, 32, 34 as described above.

Prior to the receipt of a request receive signal at one of the request receive FFs 10, the CNP signal on line 50 is Lo⇒4 and the outputs of the request receive FFs 10 are Q ⇒ Lo⇒4 causing OR/NAND 18 to couple a disabling Lo⇒4 signal on line 52 disabling the associated priority select FFs 30, 32, 34 from accepting and storing a request receive signal from the associated request receive FF 10 via the associated lines 54. When the first request receive signal is received to Set its associated request receive FF 10, e.g., FF 10-0, the Set request receive FF 10-0 coupled a Hi⇒4 signal via line 54-0 to its associated NOR 14 and to its associated input OR 17 of OR/NAND 18, and concurrently, in parallel to the Data inputs of the associated priority select FFs 30-0, 32-0, 34-0. Now, when the CNP signal on line 50 is Lo⇒4 at its associated input OR 20, OR/NAND 18 is enabled coupling an Enable → Hi⇒4 signal to line 52 and thence to the Enable input of priority select FF 30-0. Priority select FF 30-0 is then Set by the priority request signal stored in request receive FF 10-0 via line 54-0 coupling a $\overline{Q}$⇒4⇒Lo signal to Exclusive OR 36-0 via line 56-0.

Next, after the successive delay periods determined by delays 21, 23, the priority request signal held in request receive FF 10-0 is, via line 54-0, gated into the corresponding priority select FFs 32-0, 34-0 via the successively delayed Enable signals by means of lines 58, 60, respectively. Now, with both priority select FFs 30-0 and 34-0 being Set the $\overline{Q}$⇒4 output of priority select FF 30-0 via line 56-0 and the Q⇒4 output of priority select FF 34-0 via line 57-0 cause Exclusive OR 36-0 to couple a Hi⇒4 signal as an input to AND 38. As the concurrent outputs of Exclusive ORs 36-1, . . . 36-(N-1). 36-N are of a Hi⇒4 signal because the associated priority select FFs 30, 32, 34 are all of a like Cleared state, AND 38 is enabled causing AND 42, when concurrently enabled by a Hi⇒4 signal on line 41 and a Hi⇒4 Check Priority signal on line 43 to couple an Acknowledge signal to the associated memory unit. Concurrently, with priority select FF 32-0 being Set, its output, via lines 62-0, enables the priority request signal received by request receive FF 10-0 to be honored or serviced by the associated memory unit via 1-out-of-N priority network 24. After the priority request signal, as stored in priority select FF 10-0, is serviced via 1-out-of-N priority network 24 by the associated memory unit, the associated request receive FF 10-0 and the associated priority select FFs 30-0, 32-0, 34-0 are then Cleared via a selective Clear signal coupled to the associated Clear OR gates at their C inputs.

If during the above described time when the CNP signal was Lo⇒4 a second priority request signal had been set into one of the other request receive FFs 10 of request receive register 9 and thence into the associated priority select FFs 30, 32, 34 of holding register 35, e.g., request receive FF 10-n, (assuming priority selection of 1-out-of-N priority network 24 being request receive FF 10-0 having the highest priority and request receive FF 10-N having the lowest priority) after the servicing of the priority request signal in request receive FF 10-0 and priority select FF 32-0, the priority request, signal stored in priority receive FF 10-N and priority select FF 32-N would via its associated lines 62-N be serviced during the next memory cycle through the 1-out-of-N priority network 24 with the associated request receive FF 10-N and the priority select FFs 30-N, 32-N, 34-N then Cleared via a selective Clear signal coupled to the associated Clear OR gates at their C inputs.

Next, assume that a priority request signal has been priorily received by request receive FF 10-0 and when the output of OR/NAND 18 goes position (E → 4) a second priority request signal is concurrently received by request receive FF 10-1. Now, with a CNP⇒4 signal at OR 20, and NOR 14, via the Q⇒4 output of request receive FF 10-0, enabling NAND 19 the Q⇒4 output of request receive FF 10-1 is coupled via line 54-1 to the Data inputs of the associated priority select FFs 30-1, 32-1, 34-1, in the same manner as the Q⇒4 output of request receive FF 10-0 was coupled via line 54-0 to the Data inputs of the associated priority select FFs 30-0, 32-0, 34-0.

Before a priority request signal from a requester is acknowledged, priority select registers A and C are examined to determine if the information in priority select register B was stable during the time the memory unit was using the gated data. If priority select register A and C are identical, then priority select register B had to be stable. To prevent indecision from occurring, comparison should be made at a time considerably in excess of the expected flip-flop instability time for an asynchronous input. For the case of the U-7032 memory unit, comparison will be made between 100 nsec and 150 nsec after priority request signal clocking.

Table A shows the possible states of the three priority select registers for one priority request channel. An analysis of the five cases follows:

Case 1. No priority request signal was received.

Case 2. The priority request signal was received as priority select register 33 was being clocked. If priority select register 33 Sets to a zero the memory cycle is completed and if priority select register 33 Sets to a one the memory cycle is aborted.

Case 3. The priority request signal was received as priority select register 31 was being clocked. Regardless of which way priority select register 31 Sets the memory cycle is aborted.

Case 4. The priority request signal was received as priority select register 29 was being clocked. If priority select register 29 Sets to a zero the memory cycle is aborted and if priority select register 29 Sets to a one the memory cycle is completed.

Case 5. The priority request signal was received synchronously.

It can be seen from the above that while a memory cycle could be aborted even though the data gating from priority select register 31 did not change, anytime the data gating does change the memory cycle is aborted.

The three-rank priority system does require that the requester acknowledge time be long enough to permit flip-flop instability to

TABLE A

| | PRIORITY SELECT REGISTER | | | | | |
|---|---|---|---|---|---|---|
| CASE | 29 | 31 | 33 | $XOR_{29}$ | $XOR_{33}$ | $XOR_{OUT}$ |
| 1 | 0 | 0 | 0 | 1 | 0 | 1 |
| 2 | 0 | 0 | X | 1 | 1<br>0 | 0<br>1 |
| 3 | 0 | X | 1 | 1 | 1 | 0 |
| 4 | X | 1 | 1 | 1<br>0 | 1 | 0<br>1 |

TABLE A-continued

| CASE | PRIORITY SELECT REGISTER 29 | 31 | 33 | $XOR_{29}$ | $XOR_{33}$ | $XOR_{OUT}$ |
|---|---|---|---|---|---|---|
| 5 | 1 | 1 | 1 | 0 | 1 | 1 |

Where X is instability resulting in spiking and eventually setting to a 0 or a 1.

settle and a comparison of priority select registers 29 and 33 to be made.

Using this priority system results in 25 to 40 nsec improvement in access time when ECL logic is used.

Considering the above, with the two input signals to Exclusive OR 36-1 both being of a similar signal level, e.g., of a Lo⇒◀ signal significance. Exclusive OR 36-1 couples a disabling Lo⇒◀ output signal to AND 38. The so-produced Hi⇒◀ output signal on line 39 from AND 38 along with the Check Priority signal Hi⇒◀ signal on line 43 at AND 40 initiates an Abort Memory Cycle signal Hi⇒◀ causing the memory cycle to be aborted and a CNP signal to be coupled to OR/NAND 18. This reloads the priority request signal from request receive register 9 inot the three-ranks of holding register 35 and initiates a new memory cycle.

In the above described operation of the novel priority system illustrated in FIGS. 3, 4, it is apparent that the priority request signals are asynchronously received by and entered into the associated request receive FFs of request receive register 9. In contrast, the priority request signals, once transferred from the associated request receive FFs of request receive register 9 into the associated priority select FFs of priority select register 31, are synchronously processed by 1-out-of-N-priority network 24 as determined by the synchronous timing of the CNP⇒Hi⇒◀ signal on line 50 and the Check Priority⇒Hi⇒◀ signal on line 43, both synchronous signals originating in the associated data processing system including the associated memory unit.

Figure 5:
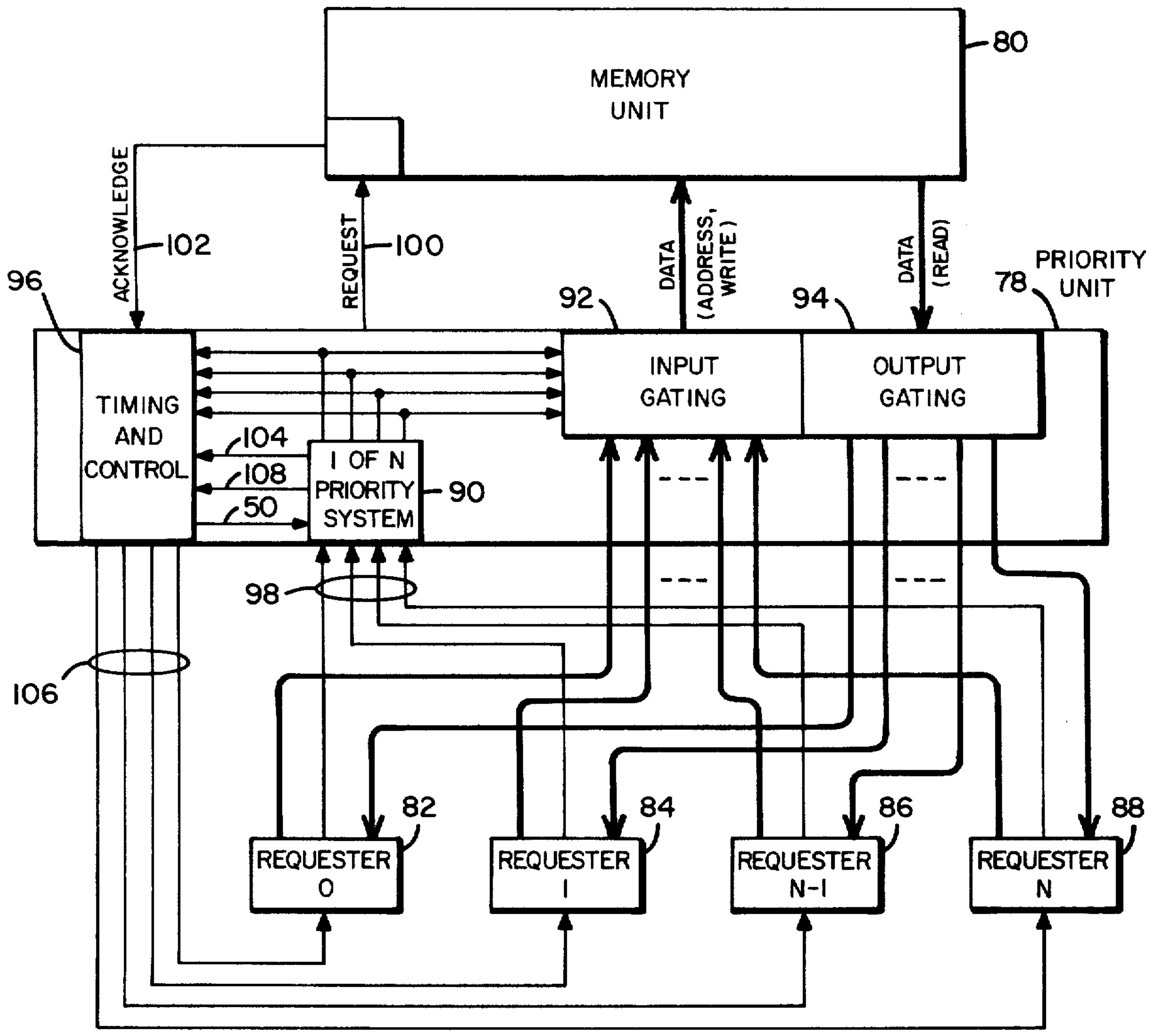
FIG. 5 is a block diagram of a data processing system incorporating the present invention.

To better understand the overall operation of the priority system of FIGS. 3, 4 there is presented in FIG. 5 a block diagram of an overall system in which a priority unit 78 provides access to memory unit 80 by one of N requesters 82, 84, . . . 86, 88. Priority system 90, which is as substantially represented by the priority system of FIG. 3, generates the appropriate signals to control input gating unit 92 and output gating unit 94 for the transfer of write data into and read data out of memory unit 80 all under control of timing and control unit 96.

Overall operation of the system of FIG. 5 is as follows:

1. One or more of the N requesters sends a priority request signal to priority system 90 of priority unit 78 via lines 98.
2. Priority system 90 determines which requesting requester has the highest priority.
3. Priority unit 78 gates the data from the highest priority requester to memory unit 80 and sends a Request signal to memory unit 80, via line 100.
4. Memory unit 80 (if not then busy) sends an Acknowledge signal back to priority unit 78 via line 102.
5. The Acknowledge signal via line 102 starts a timing chain in timing and control 96 of priority unit 78. The timing pulses, Check Priority, CNP, Clear requester's request receive FF 10, and Clear requester's priority select FFs 30, 32, 34 are generated from this timing chain along with any timing signals needed to gate the data (read) back to the appropriate requester.
6. The Abort Memory Cycle signal from priority system 90, via line 104 — see FIG. 3, causes the CNP signal to be generated by timing and control 96 and coupled to priority system 90 via line 50. This means that no Acknowledge signal will be sent to a requester via lines 105. In addition, none of the request receive FFs 10 or priority select FFs 30, 32, 34 of priority system 90 would be Cleared.
7. If the Acknowledge signal on line 108 is generated, i.e., no Abort Memory Cycle signal is generated, then the requestor having the highest priority is acknowledged via lines 106 and that requester's request receive FF 10 and priority select FFs 30, 32, 34 are Cleared at a point in the memory cycle when the data (read) has been sent to that requester. A CNP signal is generated by timing and control 96 if no priority request signals are loaded in the priority select FFs 32.

In one embodiment of the priority system of FIGS. 3, 4, delay 21 (and delay 23) provide a 2 to 5 ns delay of the enabling signal on line 52 (and on line 58). Assuming a 5.5 ns *synchronous* loading of the priority request signals into the priority select FFs 32 of priority select register 31, this means that the gated priority request signals are available at 1-out-of-N priority network 24 after a total delay of 7.5 to 10.5 ns. In the prior art embodiment of FIGS. 1, 2, the *asynchronous* loading of the priority request signals into the priority select FFs 12 of priority select register 11 require a 50.0 ns delay to permit the ringing sequence of the priority select FFs 12 to settle before reliable priority request signals are available at 1-out-of-N priority network 24. Thus, the present invention provides an improvement or reduction in the necessary delay time to ensure reliable priority request signals, in the above example, of from 50.0 ns to 10.5 ns.

What is claimed is:

1. A fail-safe priority system, comprising:
   - a receiving register comprised of N request receive FFs for receiving priority request signals;
   - a three-rank holding register comprises of three priority select registers A, B and C each of which is comprised of N priority select FFs;
   - means for coupling the output of each of said N request receive FFs as an input to the like-ordered priority select FF of said priority select registers A, B and C;
   - means successively coupling an enabling signal to the N priority select FFs of said priority select registers A, B and C for gating the priority request signals received by the request receive FFs of said receiving register into the like-ordered priority select FFs of said priority select registers A, B and C at successive delay periods;
   - means coupled to the outputs of the like-ordered priority select FFs of said priority select registers A and C for generating a signal when the states of any of the like-ordered priority select FFs of said priority select registers A and C are different.

2. A fail-safe priority system, comprising:
   - a receiving register comprised of N request receive FFs each receiving an associated one of N priority request signals;
   - a three-rank holding register comprised of three priority select registers A, B and C each of which is comprised of N priority select FFs;
   - means for coupling each of the outputs of each of said N request receive FFs as an input to the like-ordered priority select FFs of said priority select registers A, B and C;

an enabling means for generating an enabling signal;

means for coupling each of the outputs of said N request receive FFs as first inputs to said enabling means;

means coupling a CNP signal to said enabling means for enabling one or more of each of the outputs of each of said N request receive FFs to generate said enabling signal;

means coupling said enabling signal to each of the N priority select FFs of said priority select register A for gating the priority request signals received by the request receive FFs of said receiving register into the like-ordered priority select FFs of said priority select register A;

delay means coupled to the output of said enabling means for generating first and second delayed enabling signals;

means coupling said first delayed enabling signal to each of the N priority select FFs of said priority select register B for gating the priority request signals received by the request receive FFs of said receiving register into the like-ordered priority select FFs of said priority select register B;

means coupling said second delayed enabling signal to each of the N priority select FFs of said priority select register C for gating the priority request signals received by the request receive FFs of said receiving register into the like-ordered priority select FFs of said priority select register C;

N comparator means;

means coupling the output of the like-ordered priority select FFs of said priority select registers A and C to a like-ordered one of said N comparator means for generating a memory cycle abort signal when the states of any of the like-ordered priority select FFs of said priority select registers A and C are different.

3. The fail-safe priority system of claim 2 in which said delay means generates said first and second delayed enabling signals of respective delay periods for gating the priority request signals received by the request receive FFs of said receiving register into the like-ordered priority select FFs of said priority select registers B and C at successively greater delay periods after said enabling signal has gated said priority request signals into the like-ordered priority select FFs of said priority select register A.

4. A fail-safe priority system, comprising:

a receiving register comprised of N request receive FFs each receiving a dedicated one of N priority request signals;

a three-rank holding register comprised of the three priority select registers A, B and C, each of which is comprised of N priority select FFs;

means for coupling each of the outputs of each of said N request receive FFs as inputs to the like-ordered priority select FFs of said priority select registers A, B and C;

an enabling means for generating an enabling signal;

means for coupling each of the outputs of said N request receive FFs as first inputs to said enabling means;

means coupling a CNP signal to said enabling means for enabling one or more of each of the outputs of each of said N request receive FFs to generate said enabling signal;

means coupling said enabling signal to each of the N priority select FFs of said priority select register A for gating the priority request signals received by the request receive FFs of said receiving register into the like-ordered priority select FFs of said priority select register A;

delay means coupled to the output of said enabling means for generating first and second delayed enabling signals;

means coupling said first delayed enabling signal to each of the N priority select FFs of said priority select register B for gating the priority request signals received by the request receive FFs of said receiving register into the like-ordered priority select FFs of said priority select register B;

means coupling said second delayed enabling signal to each of the N priority select FFs of said priority select register C for gating the priority request signals received by the request receive FFs of said receiving register into the like-ordered priority select FFs of said priority select register C;

N Exclusive OR means;

means coupling the outputs of the like-ordered priority select FFs of said priority select registers A and C to a like-ordered one of said N Exclusive OR means for generating a memory cycle abort signal when the states of any of the like-ordered priority select FFs of said priority select registers A and C are different;

a 1-out-of-N priority network;

an associated memory unit;

means coupling the outputs of the priority select FFs of said priority select register B to said 1-out-of-N priority network for enabling said associated memory unit to honor the highest priority one of said priority request signals unless aborted by said memory cycle abort signal.

5. The fail-safe priority system of claim 4 in which said delay means generates said first and second delayed enabling signals of respective delay periods for gating the priority request signals received by the request receive FFs of said receiving register into the like-ordered priority select FFs of said priority select registers B and C at successively greater delay periods with respect to said enabling signal.

* * * * *

UNITED STATES PATENT OFFICE

CERTIFICATE OF CORRECTION

PATENT NO. : 3,921,150

DATED : November 18, 1975

INVENTOR(S) : James H. Scheuneman

It is certified that error appears in the above-identified patent and that said Letters Patent are hereby corrected as shown below:

IN THE PRINTED PATENT

Column 4, Line 57, " E - " should be -- E → 4 --.

Column 8, Line 41, " comprises " should be -- comprised --.

Signed and Sealed this ninth Day of March 1976

[SEAL]

*Attest:*

RUTH C. MASON
*Attesting Officer*

C. MARSHALL DANN
*Commissioner of Patents and Trademarks*